United States Patent [19]

Larson

[11] 4,097,699

[45] Jun. 27, 1978

[54] VISCOUS DAMPED CRASH SENSOR UNIT WITH INERTIA SWITCH

[75] Inventor: Douglas A. Larson, Oak Park, Mich.

[73] Assignee: Eaton Corporation, Cleveland, Ohio

[21] Appl. No.: 720,867

[22] Filed: Sep. 7, 1976

[51] Int. Cl.² ........................................... H01H 35/14
[52] U.S. Cl. ............................ 200/61.45 R; 200/61.53
[58] Field of Search ................ 200/61.45 R, 61.45 M, 200/61.52, 61.53

[56] References Cited

U.S. PATENT DOCUMENTS

| | | | |
|---|---|---|---|
| 3,038,973 | 6/1962 | Alpert | 200/61.53 X |
| 3,083,276 | 3/1963 | Sear et al. | 200/61.53 X |
| 3,096,411 | 7/1963 | Chabrek et al. | 200/61.53 |
| 3,217,121 | 11/1965 | Hradek | 200/61.53 |
| 3,553,482 | 1/1971 | Tavis | 200/61.53 X |
| 3,715,535 | 2/1973 | Urenda | 200/61.53 |
| 3,889,130 | 6/1975 | Breed | 200/61.53 |
| 3,974,350 | 8/1976 | Breed | 200/61.53 |

OTHER PUBLICATIONS

Breed, David S.; "The Theory and Design of a Pneumatic Time Delay Mechanism"; College Thesis; Dept. of Mechanical Engineering; M.I.T.; Sep. 1961.

Primary Examiner—James R. Scott
Attorney, Agent, or Firm—R. A. Johnston

[57] ABSTRACT

A crash sensor responsive to a predetermined change in velocity for activating a vehicular safety device. The present sensor has a gas-filled sealed tube having an inertial mass disposed therein in a closely fitting manner forming an annular orifice between the mass and the tube. The mass is preloaded and biased and, upon the tube experiencing a level of velocity change above a predetermined amount, movement of the mass in the tube to activate the set of electrical contacts is damped by viscous laminar flow of the gas through the annular orifice.

9 Claims, 3 Drawing Figures

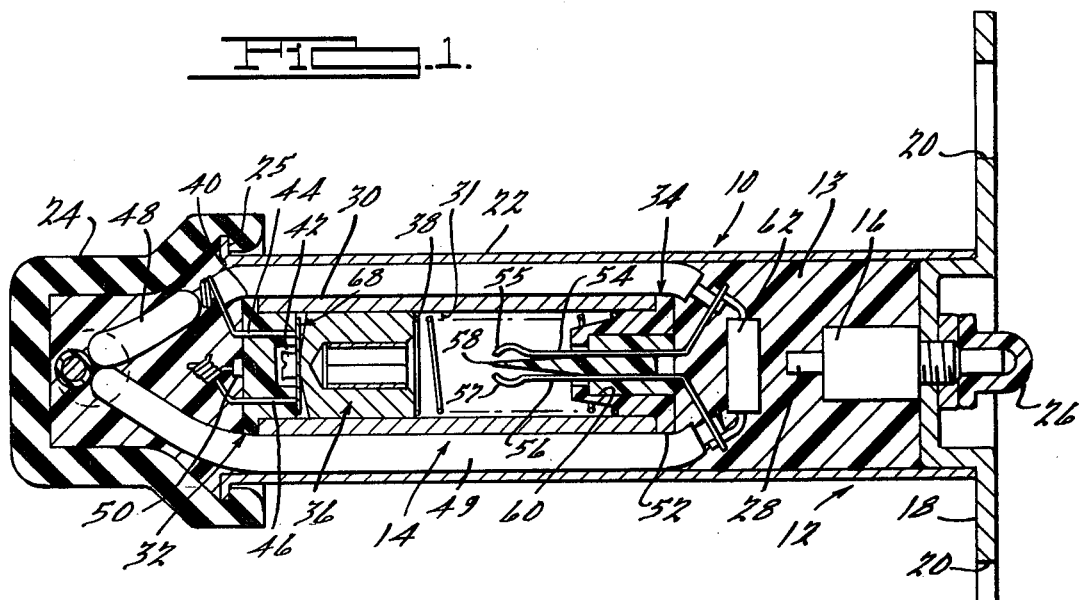
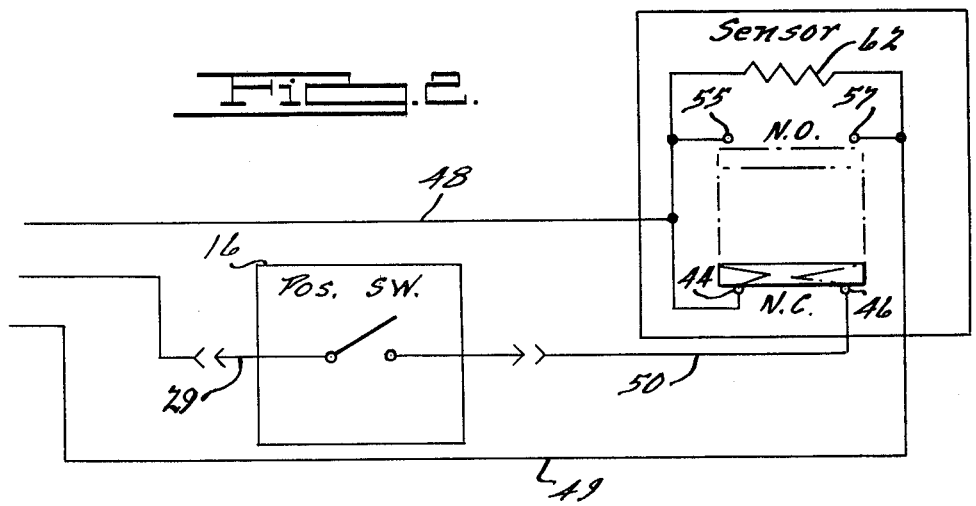
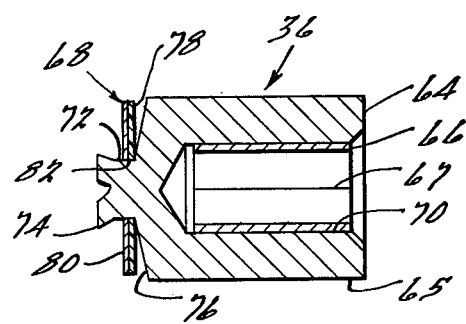

VISCOUS DAMPED CRASH SENSOR UNIT WITH INERTIA SWITCH

BACKGROUND OF THE INVENTION

The present invention relates to impact sensing devices for activating vehicle occupant safety devices in response to the vehicle experiencing a crash or collision. The most widely used types of crash sensors employ a movable inertial mass which actuates electrical contacts for activating the safety device such as an inflatable confinement. Inertial mass is either slidably contained within a housing and spring biased to the initial or at rest position, or is suspended resiliently in an initial position as, for example, a pendulum. Known sensors have also been provided which utilize a roller band or rollamite for biasing or restraining motion of the inertial mass.

The last mentioned type of prior art sensor has been disadvantageously high in cost and overly complex. The slidably contained and resiliently suspended prior art sensors, on the other hand, have generally been simpler devices but have suffered certain disadvantages in performance. One performance has been the wide variation with temperature of vehicle velocity change required to actuate the sensor.

Another performance disadvantage is the poor response of these sensors in vehicle collisions involving multiple pulse inputs. This disadvantage is exemplified in the recently issued U.S. Pat. No. 3,974,350 to David S. Breed. In this slidably contained sensor the sliding mass is biased only until a preload is overcome. Therefore, short duration multiple pulses cyclically varying above and below the preload level will result in resetting the sensor and delayed actuation.

SUMMARY OF THE INVENTION

Responsive to the disadvantages noted in the prior art crash sensors, it is an object of the present invention to provide a crash sensor for activating vehicle occupant restraint systems which is simple and inexpensive to manufacture.

It is another object to provide a slidably mounted crash sensor that is relatively insensitive to changes in operating temperature.

It is a further object to provide a slidably mounted crash sensor whose operation is unaffected by the imposition of multiple short duration crash pluses.

According to one feature of the invention, a sensor is provided in which a cyclindrical mass is biased to one end in a close fitting relationship with a gas filled tube and moveable therein against viscous damping forces to close a set of electrical contacts in response to a predetermined change in vehicle velocity.

According to another feature, materials for fabricating the mass and tube are chosen to effect compensation for temperature changes and thereby hold the viscous damping forces essentially constant.

According to still another feature, biasing force on the mass is maintained throughout its operation.

These and other objects and features will be obvious to those skilled in the art upon reading the accompanying description with reference to the attached drawings.

BRIEF DESCRIPTION OF THE DRAWINGS

FIG. 1 is a cross-sectional view of the invention crash sensor;

FIG. 2 is an electrical schematic of the invention crash sensor; and

FIG. 3 is an enlarged cross-sectional view of the inertial mass assembly of the invention sensor.

DESCRIPTION OF THE PREFERRED EMBODIMENT

Referring first to FIG. 1, the preferred embodiment of the invention crash sensor 10 is illustrated as comprising a housing assembly 12 for enclosing a sensor assembly 14, a position switch 16, and associated wiring for defining the circuit of FIG. 2.

Housing assembly 12 includes a mounting flange member 18 having bolt receiving bores 20 formed therethrough to permit attachment to a suitable structural member of the vehicle (not shown). Housing assembly 12 further includes a central tubular member 22 formed of a suitable corrosion protected metal secured to the flange member 18 and to an end cover 24. End cover 24 is formed of a flexible, high temperature resistant material and is snap fit over the end of tubular member 22 as indicated at 25.

Position switch 16 is threadedly received in the flange member 18 and includes an actuating button 26 protruding therefrom. Before installation of the sensor 10 in the vehicle, the position switch 16 is in an open position as indicated schematically in FIG. 2. When mounted on a flat surface the button 26 is depressed, closing the switch. This condition may be monitored by wires (not shown in FIG. 1) connected to a terminal 28 of the position switch 16 as indicated in FIG. 2 at 29.

Sensor assembly 14 includes a hollow cylindrical tube 30 formed preferably of a stainless steel such as AISI type 304 whose ends are closed by a normally closed contact plug assembly 32 and a normally open contact plug assembly 34. A cylindrical inertial mass assembly 36 is received in a closely fit sliding relationship with the tube 30 and is biased into contact with the normally closed contact plug assembly 32 by a preload spring 38. Both the sensor assembly 14 and the position switch 16 are resiliently mounted in the housing assembly 12 by potting as indicated at 13.

Normally closed contact plug assembly 32 consists of a flanged plug 40 preferably formed of a resilient material such as a rubber or plastic and includes a central recess 42 formed in the inner face thereof. It sealingly engages the inner periphery of the tube 30 and includes first and second wire leads 44, 46 molded in place therein. First wire lead 44 is joined to a first supply wire 48, which is inserted through the end cover 24 for connection to a power supply indicated schematically in FIG. 2. Second wire lead 46 is connected to the position switch 16 through an insulated lead wire 50.

Normally open contact plug assembly 34 includes a flanged, generally cylindrical plug member 52, first and second leaf contacts 54 and 56, respectively, and a spacer member 58. Plug member 52 is preferably formed of a high temperature resistant plastic material such as that sold by E. I. Dupont Nemours Co. under the trade name MINLON and has a stepped bore 60 formed through it for receiving the leaf contacts 54, 56 and the spacer member 58. The tapered spacer member 58 which is also formed of a high temperature resistant plastic material, is inserted between the leaf contacts 54, 56 to maintain them in spaced apart relationship and the resulting subassembly is held in the position indicated in FIG. 1 by a high temperature structural adhesive filling the stepped bore 60.

First leaf contact 54 is connected to first supply wire 48, and second leaf contact 56 is connected to a second supply wire 49. A resistor 62 is connected in parallel across the leaf contacts 54, 56 to permit monitoring the circuit closed by the normally closed contacts as indicated in FIG. 2.

The leaf contacts 54, 56 are formed from an electrically conductive material such as beryllium copper as thin, highly flexible plates having contact points 55, 57 defining spherical radii insertable in the inertial mass assembly 36. The outer surface of the contact points 55, 57 are preferably nickel plated for corrosion protection and are further gold plated to enhance conductivity, the plating being applied locally to avoid affecting the flexibility of the separate leaf contacts 54, 56.

Turning now to FIG. 3, the inertial mass assembly 36 is illustrated as including a generally cylindrical mass member 64, carrying a contact sleeve 66 and a contact disc 68.

Mass member 64 is preferably formed of a nickel-iron alloy such as that sold by Carpenter Technology Corp. as Carpenter Temperature Compensator "30" type 2, and includes a blind bore 70 for slidably receiving contact sleeve 66 which is formed as a longitudinally slit tube as indicated at 67 of electrically conductive material to eliminate induced radial stress at assembly. The outer diameter 65 of mass member 64 is sized to closely fit the inner diameter 31 of the tube 30. A diametral clearance of approximately 0.003 inches has been found acceptable for operation of the invention sensor to be described below. A reduced diameter section 72 extends from one end of mass member 64 and is sized to be received in the cavity 42 formed in the inner end of normally closed contact plug 32. The free end of reduced section 72 is deformed at 74 to retain contact disc 68 and a chamfer 76 is provided between reduced section 72 and the outer diameter 65 to provide flexibility in the mounting of disc 68. The contact disc 68 is preferably formed in two flexible layers. An optional insulating layer 78 of plastic is positioned adjacent the mass member 64. A conducting layer 80, preferably of copper plated sequentially with nickel and gold, is bonded to the left face of contact disc 68 and positioned to confront the normally closed contact plug 32 so as to close that circuit in the assembled condition of FIG. 1. The insulating layer 78 may be procured with a copper layer bonded to it from Westinghouse Corporation in the form of flexible printed circuit boards. Aligned central bores 82, formed through the layers, provide clearance over the reduced section 72 and permit self alignment of the contact disc 68.

OPERATION OF THE PREFERRED EMBODIMENT

Referring now to FIGS. 1 and 2 the general operation of the invention sensor 10 may be seen as follows:

The sensor 10 is positioned in a vehicle for actuating a passive restraint system with its longitudinal axis substantially parallel to the plane of vehicle forward motion, the right end as viewed in FIG. 1 being proximate the front of the vehicle. Securing the mounting flange 18 to the vehicle closes the position switch as hereinbefore described. The inertial mass assembly 36 is urged to the position shown in these drawing figures by the preload spring 38. When in this position, the conducting layer 80 is operative to close the circuit between wire leads 44, 46 of normally closed contact plug assembly 32 to permit electrical monitoring of the mass position.

The spring 38 exerts a force on the inertial mass assembly 36 equivalent to an inertia force of approximately 1.0G. This preload value is chosen in part to prevent inadvertent actuation of the sensor due to normal vehicle braking. Another consideration in choosing the preload is the known requirement that deployment of passive restraint systems to protect vechile occupants is unnecessary at impact levels resulting in less inertial force. It is understood, however, that other design criteria as might apply in use of the invention sensor to do other than activate a vehicle occupant restraint system may require different preloads.

Upon the occurrence of a crash in which the inertial mass assembly 36 senses a force in excess of the preload, the assembly 36 moves rightward as viewed in FIG. 1. Air trapped within the tube 30 then passes through the annular orifice formed by the diametral gap between the mass member 64 and the tube 30. Movement of the mass member 64 is thus viscously damped.

As the velocity of the crashed vehicle changes, the mass member 64 continues to move rightward against the continuous biasing force of the spring 38 and the viscous damping forces present, which are proportional to the velocity of the mass member 64, and contact points 55, 57 are engaged in the contact sleeve 66. This closes a circuit which is configured in a known manner to activate a vehicle occupant restraint system such as an air bag system. Overtravel of the mass member 64 continues until the plug 52 is engaged.

When operating as described generally above, the invention crash sensor 10 acts as a continuously biased velocity sensor. It is, therefore, insensitive to the imposition of multiple short duration pulses in that it operates to integrate the area under a velocity time curve. Such pulse inputs are known to be present during certain vehicle collision situations.

It can be shown that the displacement of the viscously damped mass member 64 is proportional to vehicle velocity change which accompanies a deceleration in excess of the preload of spring 38. For example, for the simplified case of a square wave acceleration input to the vehicle the equation of motion for a viscously damped mass member is:

$$X = -(M/D)(A-p)T$$

where
 $X$ = travel
 $M$ = mass
 $D$ = diameter
 $A$ = acceleration
 $T$ = time
 $p$ = preload force For large values of A with respect to $p$, the product $(A-p)T$ in the equation is equal to the vehicle velocity change, the proportionality stated is demonstrated in this equation.

While applicant recognizes that this useful physical phenomenon is well known, applicant's utilization of it in the present invention has advanced the state of the crash sensor art.

Knowing this relationship, applicant has found it possible to construct his velocity sensing crash sensor in a manner that makes it suitable for a wide range of vehicles operating over a broad range of temperatures and independent of deceleration level. The choice of a cylindrical mass member 64 results in a sensor having a stable response for all acceleration angles in a crash.

Holding this sensing mass constant, the sensor may be constructed to close the contacts 55, 57 upon the occurrence of a given velocity change by varying the distance to be travelled by the mass 64 and the diametral clearance of the mass-tube assembly.

A crash sensor as herein disclosed may be fabricated for a given vehicle design as follows:

Where the velocity change at which occupant restraint system activation is desired is known, and where a particular diameter and mass of the mass member 64 are chosen, the spacing between the assembled position of the mass member and the position at which it closes contacts 55, 57 is determined by setting the kinetic energy imparted equal to the potential energy resulting from the spacing and solving the equation thus formed for the spacing as follows:

$$\tfrac{1}{2} M(\Delta V)^2 = PAX$$

where
 $M$ = weight of mass member
 $\Delta V$ = vehicle velocity change
 $P$ = atmospheric pressure
 $A$ = cross-sectional area of mass
 $X$ = spacing Since there is air flow around the mass 64, the assumed pressure term of this equation is higher than actual; and the final spacing selected is increased slightly over that calculated.

The diametral clearance between the mass member 64 and the tube 30 is next determined from the relationship $$\frac{\Delta V}{X} = \frac{K}{(\text{clearance})^3}$$

where $K$ is determined from known fluid flow relationships for flow through an annular orifice formed about a cylinder as follows:

$$K = \frac{3\pi\mu D^3 L (L + \tfrac{3}{2} e^2)}{M}$$

where
 $M$ = mass member weight
 $D$ = mass member diameter
 $L$ = mass member length
 $\mu$ = viscosity of air
 $\Delta V$ = desired threshold velocity
 $X$ = spacing
 $e$ = eccentricity factor for the mass member in tube bore (experimentally found to be approximately 0.8 for a 0.31 in. diameter mass with 0.00286 clearance)

Having determined the spacing and clearance as indicated above, it can be understood that minor adjustments in the desired vehicle velocity change (commonly referred to as velocity threshold) can be made through slight changes in either of these variables.

In designing the invention crash sensor, the effect of the wide temperature changes experienced in vehicle applications must be considered. A temperature range from $-40°$ to $+250°$ F can be typically expected. Such a change grossly affects the viscosity of the air in the sensor and, therefore, if not compensated for, causes wide changes in velocity threshold with temperature. Since changes in the diametral clearance due to temperature changes will likewise produce a change in velocity threshold, it is attempted to choose materials for the tube 30 and the mass member 64 such that the differential coefficient of thermal expansion thereof compensates for the air viscosity change. The material selection may effect either a "first order" correction wherein the differential coefficient remains constant with temperature or a "second order" correction wherein the differential coefficient changes linearly with temperature to match viscosity change with temperature. Higher order correction may also be effected in which the differential of coefficients change curvilinearly with temperature.

In order to effect the indicated temperature compensation, the following procedure is employed.

First the relationship between the viscosity of air and temperature is established from graphically presented data such as that shown on p. 482 of the National Aeronautics and Space Administration document NASA SP-3045 entitled "Compressed Gas Handbook." For the temperature range of $-140°$ to $+530°$ F this relationship is approximately:

$$\mu = .18729\,(T + 290)^{.51024} \times 10^{-7}\,(\tfrac{\text{lb. F sec.}}{\text{ft}^2})$$

where
 $\mu$ = viscosity
 $T$ = temperature in °F

In order to effect the desired temperature compensation, the ratio of the viscosity to the cube of the clearance between the mass member 64 and the tube 30 must be maintained constant. The clearance must therefore be maintained proportional to the cube root of viscosity and substituting from the viscosity expression above then:

$$C \sim (T+290)^{0.17008}$$

where
 $C$ = clearance
 $T$ = temperature —°F

The desired variation of clearance with temperature from 77° F may be expressed as:

$$\frac{C}{C77} = \frac{(T + 290)^{.17008}}{367}$$

where
 $C$ = clearance
 $T$ = temperature
 $C77$ = clearance at 77° F

The expansion or change in this clearance as temperature varies from 77° F may then be expressed as:

$$\Delta C = C77 \left( \frac{[T + 290]^{.17008}}{367} - 1 \right)$$

and for a cylindrical mass-tube combination with diameter D the relative or percentage expansion is:

$$\Delta C_{rel.} = \frac{C77}{D} \left( \frac{[T + 290]^{.17008}}{367} - 1 \right)$$

The desired (expression of the) coefficient of thermal expansion is then:

$$CTE = \frac{C77 \left( \frac{[T + 290]^{.17008}}{367} - 1 \right)}{D(T - 77)}$$

For a configuration known by applicant to be successfully operable, in which a cylinder diameter of 0.31 in. and a clearance of 0.00286 in. was employed, this expression may be evaluated as:

$$CTE = \frac{(9.266 \times 10^{-3}) \left( \frac{[T + 290]^{.17008}}{367} - 1 \right)}{T - 77}$$

and, a linearized expression for the coefficient CTE from the room temperature level of 77° to any temperature between −40° and 250° F is found to be:

$$CTE = (3.104 - 0.0047T) \times 10^{-6} \text{ in/in/° F}$$

Given this linearized relationship, materials for the sleeve 30 and the mass member 64 are chosen to closely approximate the differential of coefficients at the midpoint of the temperature range. This yields a first order correction. In order to effect a second order correction, data is secured from published sources which expresses the variation of the coefficient of thermal expansion with temperature in linearized form similar to the last mentioned linearized expression for a multiplicity of materials. Materials are then chosen for the mass member and tube which yield a combined expression which closely approximates that ideal linearized expression derived above. The temperature range may then be divided into smaller increments and a curve fitted to approach the curve of the ideal non-linearized expression of the coefficient to provide higher order correction.

In the preferred embodiment disclosed, the mass member 64 is fabricated from composition 30-type 2 nickel iron alloy and the tube 30 is fabricated from type 304 stainless steel. Second order correction has been effected as follows: The relationship between the coefficients of thermal expansion and temperature for the latter material may be obtained from the American Society for Metals — Metals Handbook, 8th Edition, page as follows:

$$CTE = (9.4709 + 0.0007737T) \times 10^{-6}$$

and for the tube material similar data may be secured from the material maker to yield the following relationship:

$$CTE = (4.3010 + 0.009276T) \times 10^{-6}$$

Combining these relationships produces an expression closely matching the ideal equation above. That is:

$$\Delta CTE = (5.1699 - 0.008503T) \times 10^{-6}$$

resulting in a sensor which is accurate and which is relatively unaffected by temperature.

While the present crash sensor has been described in only one embodiment, it will be recognized by those skilled in the art that others are possible without departing from the spirit of and with the scope of the invention as claimed.

What is claimed is:

1. A viscous damped inertial sensor operable to sense velocity changes in excess of a predetermined magnitude for actuating an impact responsive system, the sensor comprising:
    A. housing means;
    B. means defining a sealed chamber containing gas and defining a substantially cylindrical bore, said chamber being disposed within said housing means;
    C. means for resiliently isolating and mounting said sealed chamber within said housing means;
    D. a mass slidably received in said bore in closely fitting relationship thereto and defining therebetween an annular gas metering orifice, said mass being movable from a first position in said bore upon said housing means experiencing a change in velocity in the direction of said bore, said mass including switch engaging means;
    E. means for preloading and continuously biasing said mass to said first position;
    F. electrical switch means disposed in predetermined spaced relationship from said mass in said first position such that, upon said housing means experiencing a predetermined velocity change in the direction of said bore, the resultant inertial force on said mass overcomes said preload and bias and said mass moves in said bore displacing said gas, and said displaced gas flows through said annular metering orifice for providing a predetermined viscous force, retarding the movement of said mass with respect to said bore such that said mass moves from said first position to place said switch engaging means in contact with said electrical switch means only when said velocity change reaches said predetermined magnitude.

2. A sensor as defined in claim 1 wherein said mass and said chamber are formed of materials, the difference of whose coefficients of thermal expansion varies with temperature so as to effect a substantially second order compensation for the change in the viscosity of said gas with temperature whereby said predetermined velocity change remains substantially constant with variations in temperature.

3. A sensor as defined in claim 1 wherein said mass is formed as a cylinder.

4. A sensor as defined in claim 1 and further comprising normally closed contact means disposed in said housing means in contact with said mass in said first position.

5. A sensor as defined in claim 1 wherein said housing means is adapted to be mounted on a substantially flat surface and further including position sensing switch means carried with said housing for indicating that said housing means is mounted on said surface.

6. A sensor as defined in claim 1 wherein said preloading and biasing means comprises a spring exerting a force approximately equal to the force of gravity on said mass in said first position and a force approximately equal to twice the force of gravity on said mass in said position wherein closure is effected.

7. A viscous damped inertial sensor operable to sense velocity changes in excess of a predetermined magnitude for actuating an impact responsive system, comprising:
    A. housing means;
    B. means defining a sealed chamber containing a gas and defining a substantially cylindrical bore, said chamber defining means being disposed within said housing means, said sealed chamber being formed of an austenitic stainless steel having a predetermined coefficient of thermal expansion;

C. means for resiliently mounting said chamber within said housing means;

D. a mass slidably received in said bore in closely fitting relationship thereto and defining therebetween an annular gas metering orifice, said mass being formed of a nickel-iron alloy including approximately 30 percent nickel by weight and whose coefficient of thermal expansion changes with changes in temperature at a substantially faster rate than that of said austenitic stainless steel for providing a second order temperature compensating effect, said mass being movable from a first position in said bore upon said housing means experiencing a change in velocity in the direction of said bore;

E. means for preloading and continuously biasing said means to said first position;

F. electrical contact means disposed in predetermined spaced relationship from said mass in said first position such that, upon said housing means experiencing a predetermined velocity change in the direction of said bore, the resultant inertial force on said mass overcomes said preload and bias and said mass moves in said bore displacing said gas, and said displaced gas flows through said annular metering orifice for providing a predetermined viscous force, retarding the movement of said mass with respect to said bore such that said mass moves from said first position to encounter and effect actuation of said electrical contact means only when said velocity change reaches said predetermined magnitude.

8. A viscous damped inertial sensor operable to sense velocity changes in excess of a predetermined magnitude for actuating an impact responsive system, the sensor comprising:

A. housing means;

B. means defining a sealed chamber containing gas and defining a substantially cylindrical bore, said chamber defining means being disposed within said housing means;

C. a mass slidably received in said bore in closely fitting relationship thereto and defining therebetween an annular gas metering orifice, said mass being movable from a first position in said bore upon said housing means experiencing a change in velocity in the direction of said bore, said mass including switch engaging means;

D. electrical switch means disposed in predetermined spaced relationship from said mass in said first position such that, upon said housing means experiencing a predetermined velocity change in the direction of said bore, the resultant inertial force acting upon said mass moves in said bore displacing said gas, said displaced gas flows through said annular metering orifice for providing a predetermined viscous force, retarding the movement of said mass with respect to said bore such that said mass moves from said first position to place said switch engaging means in contact with said electrical switch means only when said velocity change reaches and exceeds said predetermined magnitude, said mass and said chamber defining means being formed of materials having a difference of coefficients of thermal expansion varying with temperature so as to effect a second order compensation for the change of the viscosity of said gas with temperature whereby said predetermined velocity change remains substantially constant with variations in temperature.

9. A viscous damped inertial sensor operable to sense and cumulatively integrate over a time interval velocity changes in excess of a predetermined magnitude for actuating an impact responsive system, comprising:

A. container means defining a bore therein, said container means being filled with a gas hermetically confined therein;

B. a predetermined mass disposed within said container and movable between a first and second position, said mass in said first position cooperating with said housing means to define a volume of said gas, the distance moved by said mass between said first and second position being such that the product of said gas volume and the pressure thereof within said container is substantially equal to the kinetic energy of said mass at the predetermined velocity magnitude, said mass having the outer surface thereof spaced closely adjacent said bore, said spacing between said bore and said mass defining an annular metering orifice therebetween, said annular orifice permitting only laminar flow therethrough for viscously damping the motion of said mass as said gas is displaced through said annular orifice, said spacing being such that all of said kinetic energy of said mass at said predetermined velocity is dissipated as said mass moves through said distance;

C. means for continuously biasing said mass toward said first position, said biasing means being effective for preloading said mass in said first position against inertial forces acting upon said mass at velocity changes below said predetermined magnitudes;

D. electrical switch means disposed within said container means; and

E. engaging means operative upon movement of said mass to said second position to actuate said switch means.

* * * * *